US008204987B2

United States Patent
Bi et al.

(10) Patent No.: US 8,204,987 B2
(45) Date of Patent: Jun. 19, 2012

(54) PROVIDING REPORTS OF RECEIVED MULTIMEDIA PROGRAMS

(75) Inventors: Haifeng Bi, San Antonio, TX (US); Xiaolian Bi, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 292 days.

(21) Appl. No.: 12/331,204

(22) Filed: Dec. 9, 2008

(65) Prior Publication Data
US 2010/0146102 A1 Jun. 10, 2010

(51) Int. Cl.
*G06F 15/173* (2006.01)

(52) U.S. Cl. ......... 709/224; 709/217; 709/219; 709/225

(58) Field of Classification Search ............ 709/217, 709/219, 224, 225
See application file for complete search history.

(56) References Cited

U.S. PATENT DOCUMENTS

| 5,758,259 | A | 5/1998 | Lawler |
| 6,681,393 | B1 | 1/2004 | Bauminger et al. |
| 6,727,914 | B1 | 4/2004 | Gutta |
| 7,051,352 | B1 | 5/2006 | Schaffer |
| 7,096,486 | B1 | 8/2006 | Ukai et al. |
| 2003/0097353 | A1 | 5/2003 | Gutta et al. |
| 2007/0061332 | A1 | 3/2007 | Ramer et al. |
| 2007/0061831 | A1* | 3/2007 | Savoor et al. .................. 725/13 |
| 2008/0276277 | A1 | 11/2008 | Ahn et al. |
| 2011/0131604 | A1* | 6/2011 | Van Hoff et al. ............... 725/38 |
| 2011/0135271 | A1* | 6/2011 | Van Hoff et al. ............. 386/200 |

* cited by examiner

*Primary Examiner* — Mohamed Wasel
(74) *Attorney, Agent, or Firm* — Jackson Walker L.L.P.

(57) ABSTRACT

User input defining criteria for including a multimedia presentation event in an event report is received. The criteria include a maximum retention period, a threshold presentation duration, and a report condition. When a user receives a multimedia program for a time at least as great as the threshold presentation duration, data indicating receipt of the multimedia program is stored. The receipt data is used to determine whether the receipt of the multimedia program meets the report condition. Access to the event report is provided to a user in response to a user input. The event report indicates receipt of the multimedia program if the receipt data meets the report condition. The receipt data is purged when an age of the receipt data equals or exceeds a maximum retention period.

17 Claims, 3 Drawing Sheets

PROVIDING REPORTS OF RECEIVED MULTIMEDIA PROGRAMS

BACKGROUND

1. Field of the Disclosure

The present disclosure generally relates to multimedia content distribution networks and more particularly to providing users access to reports regarding received multimedia content.

2. Description of the Related Art

Multimedia content may be received over a multimedia content distribution network (MCDN). In traditional systems, a parent or administrator has a limited ability to know what content is received from the MCDN.

DESCRIPTION OF EXEMPLARY EMBODIMENTS

Figure 1:
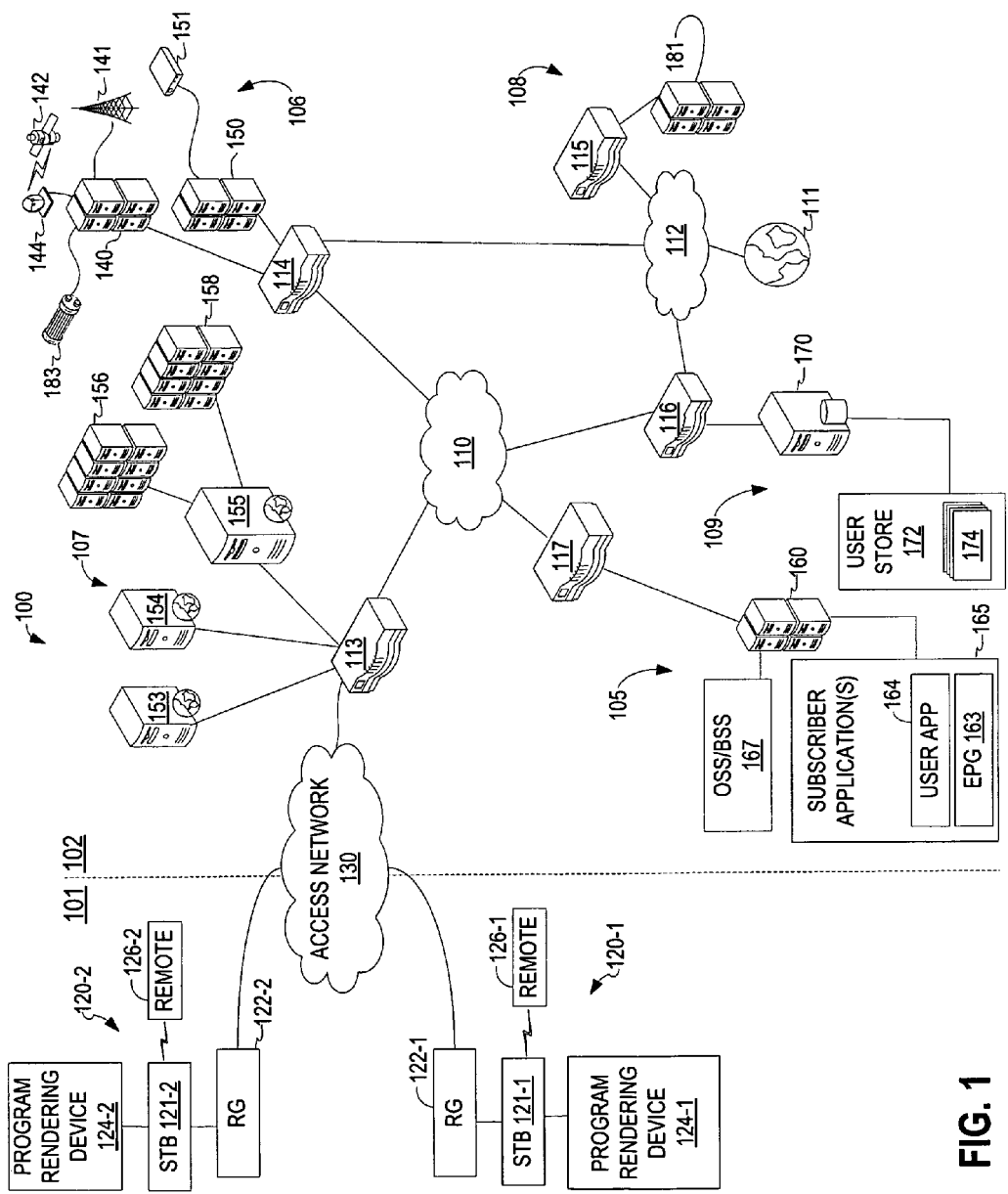
FIG. 1 illustrates a representative Internet protocol television (IPTV) architecture for receiving multimedia programs and, in accordance with disclosed embodiments, providing reports of qualifying selections of multimedia programs.

Television programs, video on-demand (VOD) movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band or frequency channel, through a coaxial cable, a fiber-optic cable, or a combination of the two. The bandwidth required to transport simultaneously a large number of multimedia channels may challenge the bandwidth capacity of cable-based networks. In these types of networks, a tuner within an STB, television, or other form of receiver is required to select a channel from the mixed signal for playing or recording. A user wishing to play or record multiple channels typically needs to have distinct tuners for each desired channel. This can be an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel.

IPTV may be implemented, at least in part, over existing infrastructure including, for example, a proprietary network that may include existing telephone lines, possibly in combination with customer premises equipment (CPE) including, for example, a digital subscriber line (DSL) modem in communication with an STB, a display, a program rendering device, and other appropriate equipment to receive multimedia content and convert it into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view (PPV), advanced programming information (e.g., sophisticated and customizable electronic programming guides (EPGs), and the like. Bidirectional networks may also enable a service provider to collect information related to a user's preferences, whether for purposes of providing preference based features to the user, providing potentially valuable information to service providers, or providing potentially lucrative information to content providers and others.

Disclosed embodiments provide a report of multimedia program selections that qualify for the report according to user specified parameters. A user may define a maximum retention period for storing selection data, a minimum presentation duration used to determine whether a selection qualifies to be stored or included in the report, and report criteria used for filtering and selecting stored elements for the report.

In some embodiments, when a multimedia program or channel is selected, a timer is started to account for the time spent presenting the program. A minimum presentation duration is compared to a timer value (i.e., the amount of time the multimedia program is presented). If the timer value meets or exceeds the minimum presentation duration, the selection of the multimedia program may qualify for storing as a multimedia presentation event. The timer may count contiguous multimedia presentation events and may be reset each time a new multimedia program or channel is selected. Alternatively, the timer value may count noncontiguous multimedia presentation events and account for a total time spent on a multimedia program or channel in determining the timer value, and hence whether data for the multimedia presentation event is stored or reported.

To conserve resources, data related to multimedia presentation events may be purged after a maximum retention period. For example, data related to multimedia presentation events that occurred more than ninety days ago may be purged automatically. The maximum retention period (e.g., ninety days) may be set by an administrator (e.g., a parent) of a local network, may be set by an operator of an MCDN, or may be preconfigured with hardware or firmware. In some cases, new data may arrive for storage while older data that is still within the maximum retention period completely fills a storage resource. In such cases, the data may be stored on first in first out (FIFO) basis with the oldest data purged on a rolling basis to make room for the new data.

Accordingly, disclosed systems collect data for multimedia presentation events, and users may provide duration criteria for determining what qualifies as a multimedia presentation event. In addition, the user may provide retention criteria for determining a maximum retention period for storing the collected data, and the collected data may be purged after the maximum retention period. The collected data may be stored on a rolling basis with older data purged first.

Once multimedia presentation event data is collected and stored, a user may request a report of most received multimedia programs or channels, for example. The report may be presented to a user in a default configuration which includes, for example, a list of ten channels that have been viewed for the longest duration during the past week. If the user wishes to view a report in a different configuration than the default, the user may provide report criteria for filtering, selecting, and arranging elements within the report. Reports may include indications of multimedia presentation events arranged, for example without limitation, according to: genre, content, appropriateness ratings, quality ratings, production date, actor, producer, channel, duration, date of presentation, and popularity.

In one aspect, a disclosed service provides a report of multimedia presentation events. The disclosed service includes receiving user input that defines a threshold presentation duration that qualifies as a multimedia presentation event for storing. If a user receives a multimedia program for a time equal to or greater than the threshold presentation duration, the receipt of the multimedia program qualifies as a multimedia presentation event and corresponding data is stored. The data may be stored locally to an STB or remotely on one or more network devices. User provided criteria may also include a retention period that defines a limit on the age of qualifying events that are saved. After the retention period, stored data for multimedia presentation events is subject to purging. If a storage resource is filled to capacity and new data arrives, the oldest data may be purged before the oldest data is stored for the entire retention period. In some embodiments, further user input may provide criteria for purging data according to other criteria (e.g., lowest viewing duration).

Accordingly, the disclosed service monitors selections of multimedia content to determine whether receipt of a multimedia program qualifies as a multimedia presentation event and, if it does, the service stores data related to the selection of the multimedia programs. For example, viewing duration, channel, and information received from metadata for the multimedia program may be stored. The service may provide a user (e.g., an administrator) with a report according to report criteria provided with user input. Exemplary reports include indications (e.g., titles, screen shots, etc.) of qualifying multimedia presentation events that meet threshold presentation duration requirements and other report criteria.

In another aspect, a disclosed process provides users with a report of most received multimedia programs or channels. Reports include information (e.g., title, channel, duration of receipt, etc.) corresponding to selections of multimedia programs that qualify according to user criteria. The process includes receiving values for user input parameters that define when a multimedia program selection is a qualifying selection. The user input parameters include a minimum presentation duration that is compared to a receiving duration defined by the cumulative time a multimedia program is received by or presented to a user (i.e., presented to a user customer premises equipment). The user input parameters may also include a maximum retention period that affects whether data for the multimedia program selection is eligible to remain stored. After the multimedia program selection has an age exceeding the maximum retention period, the multimedia program is purged from storage. Reports initially may be provided in a default configuration, and users may provide report criteria for selecting, filtering, and organizing information in reports.

Disclosed processes may include monitoring a user selection of multimedia content to compare the receiving duration of the multimedia program selection to the minimum threshold presentation duration. If the receiving duration meets or exceeds the threshold presentation duration, data for the selection is stored as a multimedia presentation event. The data is stored for a retention period, which defines the maximum age for stored data before it is subject to purging. A user may provide user input (e.g., report criteria and a report request), and responsive to the user input, disclosed processes access qualifying multimedia events from the stored data and provide the data in a report according to the report criteria.

In still another aspect, a disclosed MPR includes a tangible computer readable medium with instructions for receiving user input that defines report criteria, retention criteria, and duration criteria. Further instructions enable the MPR to provide reports with data that is selected, filtered, and arranged according to the user input. The reports contain indications of most received multimedia programs and/or channels. Instructions executed by the MPR may compare a receiving duration (e.g., a duration for a user receiving a multimedia program or channel) to a threshold presentation duration. If the user receives the multimedia program for a time equal to or greater than the threshold presentation duration, the receipt of the multimedia program qualifies as a multimedia presentation event that is stored. A defined retention period limits the age of qualifying multimedia presentation events that remain stored. The retention period may begin at the time of storing the data, the time the multimedia presentation event begins, the time the multimedia presentation event ends, or at the end of a multimedia session, as examples. Further instructions enable the MPR to receive a user input to select the multimedia program and to populate the report with indications of the multimedia presentation events that meet report criteria and duration criteria.

Below, exemplary embodiments are described in sufficient detail to enable one of ordinary skill in the art to practice the disclosed subject matter without undue experimentation. It should be apparent to a person of ordinary skill that the disclosed examples are not exhaustive of all possible embodiments. Regarding reference numerals used to describe elements in the figures, a hyphenated form of a reference numeral refers to a specific instance of an element and an un-hyphenated form of the reference numeral refers to the element generically or collectively. Thus, for example, element 121-1 refers to an instance of an STB, which may be referred to collectively as STBs 121 and any one of which may be referred to generically as an STB 121.

Referring now to the drawings, FIG. 1 illustrates selected aspects of an MCDN 100 for monitoring and reporting regarding most requested content. MCDN 100, as shown, is a multimedia content provider network that may be generally divided into a client side 101 and a service provider side 102 (a.k.a., server side 102). Client side 101 includes all or most of the resources depicted to the left of access network 130 while server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical cables that connect a subscriber's home or business to a local exchange. In these embodiments, the physical layer of access network 130 may include both twisted pair copper cables and fiber optics cables. In a fiber to the curb (FTTC) access network, the "last mile" portion that employs copper is generally less than approximately 300 feet in length. In fiber to the home (FTTH) access networks, fiber optic cables extend all the way to the premises of the subscriber.

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. Also in these embodiments, access network 130 may receive upstream traffic from a consumer's location using quadrature phase shift keying (QPSK) modulated RF signals.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements (e.g., emergency alert system messages) from local entities. The regional VHOs may then deliver the local and national content to users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 may communicate over a public network 112, including, for example, an Internet or other type of Web network which is signified in FIG. 1 by the World Wide Web icon 111.

As shown in FIG. 1, client side 101 of MCDN 100 depicts two of a potentially large number of client side resources referred to herein simply as client(s) 120. Each client 120, as shown, includes an STB 121, a residential gateway (RG) 122, a program rendering device 124, and a remote control device 126. In the depicted embodiment, STB 121 communicates with server side devices through access network 130 via RG 122.

As shown in FIG. 1, RG 122 may include elements of a broadband modem (e.g., DSL modem or cable modem) and may communicate over wireless and/or wired interfaces. In addition, RG 122 may have elements of a firewall, router, switch, and access point for local area network (LAN) devices to communicate through wired and wireless (e.g., WiFi) Ethernet or other suitable networking technologies. In some embodiments, STB 121 is a uniquely addressable Ethernet compliant device. Program rendering device 124 may be, for example, any National Television System Committee (NTSC) and/or Phase Alternating Line (PAL) compliant program rendering device. Both STB 121 and program rendering device 124 may include any form of conventional frequency tuner.

In IPTV compliant implementations of MCDN 100, clients 120 are configured to receive packet-based multimedia streams from access network 130 and process the streams for presentation on program rendering devices 124. In addition, clients 120 are network-aware resources that may facilitate bidirectional-networked communications with server side 102 resources to support network hosted services and features. Because clients 120 are configured to process multimedia content streams while simultaneously supporting more traditional Web like communications, clients 120 may support or comply with a variety of different types of network protocols including streaming protocols such as real-time transport protocol (RTP) over user datagram protocol/Internet protocol (UDP/IP), as well as web protocols such as hypertext transport protocol (HTTP) over transport control protocol (TCP/IP).

The server side 102 of MCDN 100, as depicted in FIG. 1, emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down-linked signals transmitted by a satellite 142 and received by a parabolic dish 144. In addition, live acquisition server 140 may acquire programming feeds transmitted via high-speed fiber feed 183 or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Live acquisition server 140 is communicatively coupled to an encoder which, prior to transmission, encodes acquired content using for example, Motion Picture Expert Group (MPEG) standards such as MPEG-2, MPEG-4, a Windows Media Video (WMV) family codec, or another suitable video codec.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content according to the network communication protocol stack in use. These data packets are then transmitted across a network to a receiver (e.g., STB 121 of client 120), where the content is parsed from individual packets and re-assembled into multimedia content suitable for processing by a decoder.

User requests received by content delivery server 155 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 126 to send a signal to STB 121 indicating a request for the particular channel. When STB 121 responds to the remote control signal, the STB 121 changes to the requested channel by transmitting a request that includes an indication of the network endpoint associated with the desired channel to content delivery server 155.

Content delivery server 155 may respond to such requests by making a streaming video or audio signal accessible to the user. Content delivery server 155 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including RTP, real-time control protocol (RTCP), file transfer protocol (FTP), and real-time streaming protocol (RTSP).

In some embodiments, client-facing switch 113 routes multimedia content encapsulated into IP packets over access network 130. For example, an MPEG-2 transport stream may be sent in which the transport stream consists of a series of 188-byte transport packets. In some embodiments, the MPEG-2 transport stream may include reports of qualifying multimedia presentation events for a presentation on a user's program rendering device, in accordance with disclosed embodiments. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153, and client gateway 153 may then allow such devices to access private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167, which may translate a query to the OSS/BSS server 181. Upon client gateway 153 confirming subscriber and/or billing information, client gateway 153 may allow STB 121 access to IPTV content, VOD content, and other services. If client gateway 153 cannot verify subscriber information (i.e., user information) for STB 121, for example, because it is connected to an unauthorized local loop or RG, client gateway 153 may block transmissions to and from STB 121 beyond access network 130.

MCDN 100, as depicted, includes application resources 105, which communicate with private network 110 via application switch 117. Application resources 105, as shown, include application server 160 which is operable to host or otherwise facilitate one or more subscriber applications 165 that are made available to system subscribers. For example, subscriber applications 165, as shown, include EPG application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may be an application that monitors requests (e.g., channel selections or multimedia program selections) for multimedia content, applies administrator configured rules and parameters, stores data for qualifying presentation events, and provides a report regarding qualifying presentation events. User application 164, as illustrated in FIG. 1, emphasizes the ability to extend the network's capabilities by implementing a network-hosted application. Because the application resides on the network, it generally does not impose any significant requirements or imply any substantial modifications to client 120 including STB 121. In some instances, an STB 121 may require knowledge of a network address associated with user application 164, but STB 121 and the other components of client 120 are largely unaffected.

As shown in FIG. 1, a database switch 116, as connected to applications switch 117, provides access to database resources 109. Database resources 109 include database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

As shown, MCDN 100 is enabled to provide a service that reports qualifying multimedia presentation events. The service includes receiving user input defining criteria for including a multimedia presentation event in the report. The criteria may be provided using remote control device 126 which, as shown, is communicatively coupled to STB 121. The user input defining criteria may also be provided using a PC (not depicted) or other data processing system (e.g., smart phone) which may be communicatively coupled to STB 121. If necessary, STB 121 may relay the criteria through RG 122, over access network 130, and to any network-based component (e.g., user application 164) that needs the user defined criteria for detecting or reporting qualifying events. User input that defines criteria for including a multimedia presentation event in a report may also be provided through a web portal accessed by STB 121, by a wireless telephony device (e.g., smart phone), or by a PC (not depicted) communicatively coupled to client 120 or one or more elements of server side 102.

In an exemplary embodiment, the criteria received from the user include a threshold presentation duration. If the user receives a multimedia program on program rendering device 124-2 through STB 121-2 for the threshold presentation duration (e.g., fifteen minutes), the receipt of the multimedia program qualifies as a presentation event and corresponding data is stored. In response to user input to receive a report, stored data is selected based on report criteria that defines rules for filtering and selecting portions of the stored data.

After a retention period, or in some cases to make room for newer data, data related to multimedia presentation events may be purged. A report may be provided in a default configuration, or a user may provide report criteria that otherwise limits, filters, or selects portions of the stored data for inclusion in the report. For example, a user may provide report criteria that specify that the report includes the ten most viewed channels for the last week. In the report, an indication of the channel may be included with a total duration time for the week, a list of programs that were watched during the week, identifiers for users that viewed the channels during the week, and other such information.

As a user of STB 121 selects various multimedia programs or channels for presentation on program rendering device 124, STB 121 monitors the duration that a user spends watching the multimedia programs or channels. If the monitored duration meets or exceeds a specified duration, a multimedia presentation event is registered and data corresponding to the multimedia program or channel is stored and retained for a retention period. Accordingly, disclosed embodiments prevent saving data related to channel surfing, which occurs for example when a user repeatedly presses an up channel button to rapidly scroll through channels. Stored data corresponding to multimedia presentation events may be stored locally to the STB 121 or may be stored on a network-based component (e.g. user application 164). In some embodiments, user application 164 or other network-based components may perform portions of disclosed processes including monitoring the duration the user spends watching a multimedia programs or channels, receiving duration criterion, receiving retention criteria, receiving report criteria, storing multimedia presentation event data, and purging multimedia presentation event data.

After the data related to a selection of multimedia programs is stored, the data may be analyzed to detect qualifying presentation events that meet report criteria and that meet minimum presentation duration requirements. Analysis of the data may be in response to user input to access the report or may be performed periodically to prevent latencies that may otherwise be involved with analyzing the data "on the spot" in response to the user input. After the data related to the multimedia program selections is analyzed and qualifying presentation events are detected, a report with indications (e.g., program titles, channels, etc.) of the qualifying presentation events is presented on program rendering device 124-2, for example. After a retention period, stored data may be purged.

In some embodiments, access to the report may be restricted to an administrator (e.g. a parent). Accordingly, a user is required to enter login credentials before requesting a report. In some embodiments, non-contiguous presentation periods associated with a particular channel may be added towards a presentation duration to determine whether the minimum presentation duration is met. For example, if a user attempts to avoid detection of the presentation of certain content by alternating between two channels rapidly, a sum of the total presentation duration from the non-contiguous presentation events associated with each of the respective channels may be added. In other embodiments, the number of times that a multimedia program is selected may be a user criterion that is used to determine whether data for a presentation event is stored and/or reported.

In some embodiments, a user may be presented with selectable predetermined threshold presentation durations, report criteria, and retention periods on program rendering device 124. For example, a user may be presented with a user interface that asks the user to select a retention period of one day, one week, one month, or two months. In addition, the user may be presented with selectable predetermined presentation durations often seconds, twenty seconds, one minute, thirty minutes, or fifty minutes. In this way, disclosed embodiments enable an administrator to receive reports or logs of multimedia program selections without being overburdened with data.

Figure 2:
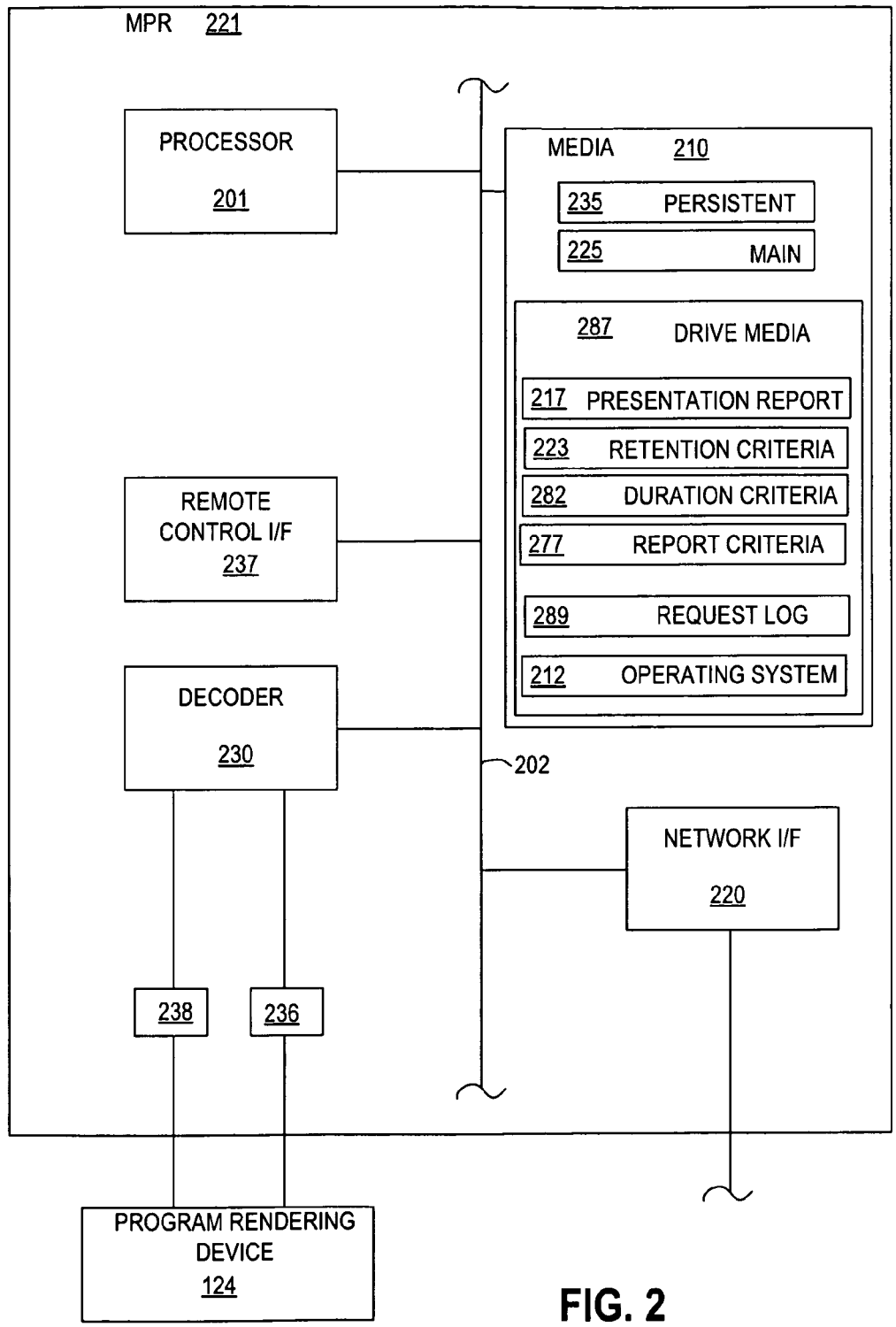
FIG. 2 is a block diagram of selected elements of a multimedia processing resource (MPR), which may be similar to or identical to set-top box (STB) 121 in FIG. 1, and which may be used in accordance with disclosed embodiments to monitor multimedia program selections and provide a report of qualifying selections.

Referring to FIG. 2, a block diagram illustrating selected elements of MPR 221 is presented. In the depicted embodiment, MPR 221 includes a processor 201 communicatively coupled to media 210 via a shared bus 202. Media 210 may include persistent media 235, volatile media, fixed media, removable media, magnetic media, and semiconductor media. Media 210 is operable to store instructions, data, or both. Media 210 as shown includes multiple sets or sequences of instructions, namely, operating system 212, request log 289, duration criterion 282, retention criterion 223, and presentation report 217. Operation system 212 may be a Unix® or Unix-like operating system, a Windows® family operating system, or another suitable operating system.

MPR 221 as depicted in FIG. 2 further includes a network adapter 220 that interfaces MPR 221 to access network 130 (FIG. 1), possibly through a residential gateway (e.g., RG 122 in FIG. 1). MPR 221 may be similar to or identical to STB 121 and receive multimedia content such as television content from access network 130 (FIG. 1). In embodiments suitable for use in IP based content delivery networks, MPR 221, as depicted in FIG. 2, may include an audio/video (A/V) decoder 230 that assembles payloads from a sequence or set of network packets into a stream of multimedia content. The stream of multimedia content may include audio information and video information and A/V decoder 230 may parse or segregate the two to generate a video stream 238 and an audio stream 236 as shown. Reports of qualifying multimedia events may be encoded in video stream 238 for presentation on program rendering device 124 (FIG. 1).

Video and audio streams 238 and 236 may include audio or video information that is compressed, encrypted, or both. Video stream 238 may include information formatted using any video decoding algorithm including for example without limitation any MPEG or WMV standard. Similarly, audio stream 238 may include information formatted using any audio decoding algorithm including for example without limitation: Dolby® Digital, Digital Theatre System (DTS) Coherent Acoustics, and Windows Media Audio (WMA). The video and audio streams 238 and 236, as shown in FIG. 1, are sent in a format compliant with program rendering device 124, which itself may not be a part of MPR 221. Program rendering device 124 may comply with NTSC, PAL or any other suitable television standard.

As shown in FIG. 2, media 210 is a tangible computer readable medium that includes instructions for receiving user input defined criteria for including a multimedia presentation event in a report. The user input may be received over network interface 220 and the criteria may be stored within drive media 287 as report criteria 277, retention criteria 223 and duration criteria 282. Examples of presentation durations stored in duration criteria 282 are thirty minutes and fifteen minutes. In accordance with disclosed embodiments, duration criterion 282 includes a threshold presentation duration. If a user receives a multimedia program for a time equal to or greater than the threshold presentation duration, the receipt of the multimedia program qualifies as a multimedia presentation event.

User input to select a multimedia program may be provided through remote control interface 237 through, for example, an "up channel" or "down channel" command. Accordingly, remote control interface 237 is enabled to receive IR signals, radio signals, or other communication signals from a remote control device (e.g., remote control device 126 in FIG. 1). If minimum duration criteria are met, data related to a request to receive multimedia programs is stored within request log 289. In alternate embodiments, data related to requests to receive multimedia programs may be stored in a networked device and accessed or downloaded when needed. Request log 289, in some embodiments, may include a total time that a user receives programming from a channel, the total time that a user receives a particular multimedia program, and a timestamp for when multimedia content is received. Data stored within request log 289 is purged after its age reaches the retention period. The retention period is stored within retention criteria 223 and defines a limit on the age of qualifying multimedia presentation events that remains stored in request log 289. The retention period may be preconfigured by developers of MPR 221, may be provided with user input, or may be provided through administrator input. In response to user input to view a log (i.e., report) of qualifying multimedia presentation events, processor 201 executes instructions for determining which presentation events within request log 289 qualify to be included in the log (e.g., presentation report 217) presented to the user. Presentation report 217 contains data for providing the requested report, which contain indications of qualifying multimedia presentation events on program rendering device 124. The report may be accessed by the user selecting a special information channel (e.g., channel 92). The report may also be accessed by a PC or other data processing system communicately coupled to MCDN 100.

As shown, MPR 221 may be enabled to perform an embodied process for providing a report of qualifying selections of multimedia programs. Accordingly, the embodied process includes receiving user input parameters that define when a multimedia program selection is a qualifying selection. User input parameters may be received from a remote control device (e.g., remote control device 126 in FIG. 1) over remote control interface 237. Alternatively, the user input parameters may be received from a data processing system (e.g., a computer) over network interface 220. The user input parameters include minimum presentation duration stored as duration criteria 282, report criteria 277, and optionally a maximum retention period stored as retention criteria 223. The minimum presentation duration is compared to a duration in which a multimedia program is presented on program rendering device 124 (i.e., received by the user). If the multimedia program is presented on program rendering device 124 for a time equal to or greater than the minimum presentation duration, data representing the selection of the multimedia program as a qualifying event may be stored to request log 289.

In performing the embodied process, MPR 221 may receive user input parameters that specify a maximum retention period and specify report criteria 277. As shown in FIG. 2, MPR 221 stores the maximum retention period within retention criteria 223. The maximum retention period affects when data corresponding to a multimedia program selection is purged. If the data for the multimedia program selection has an age that meets or exceeds the maximum retention period, the data for the multimedia program selection is purged. Report criteria 277 have stored user preferences for selecting, filtering, organizing, and presenting information in the requested reports. Request log 289 may contain a relatively large amount of data, and report criteria 277 allows a user to receive a manageable amount of data that also meets the user's informational needs.

MPR 221 decodes for program rendering device 124 multimedia content received from a multimedia content distribution network (e.g., MCDN 100 in FIG. 1). In addition, selections of multimedia content are monitored to compare the receiving duration of a multimedia program selection to the minimum threshold presentation duration (e.g., stored as duration criteria 282). On a periodic basis, in response to low levels of storage, or in response to receiving a report request, MPR 221 may determine whether the age of the data for multimedia program selections meets or exceeds the maximum retention period (e.g., as stored as retention criterion 223). If the data meets or exceeds the maximum retention period, the data is purged.

In response to a user's request to view a report, MPR 221 produces the report with video stream 238 and/or audio stream 236 for presentation by program rendering device 124. The displayed report includes indications (e.g., text, icons, video clips, screen shots, photographs, synthesized voice output, metadata, and avatars) of qualifying multimedia program selections. In some embodiments, the displayed report includes indications of the channel on which selected multimedia programming is received, the amount of time spent on the channel, and one or more timestamps of when the multimedia programming was received.

Figure 3:
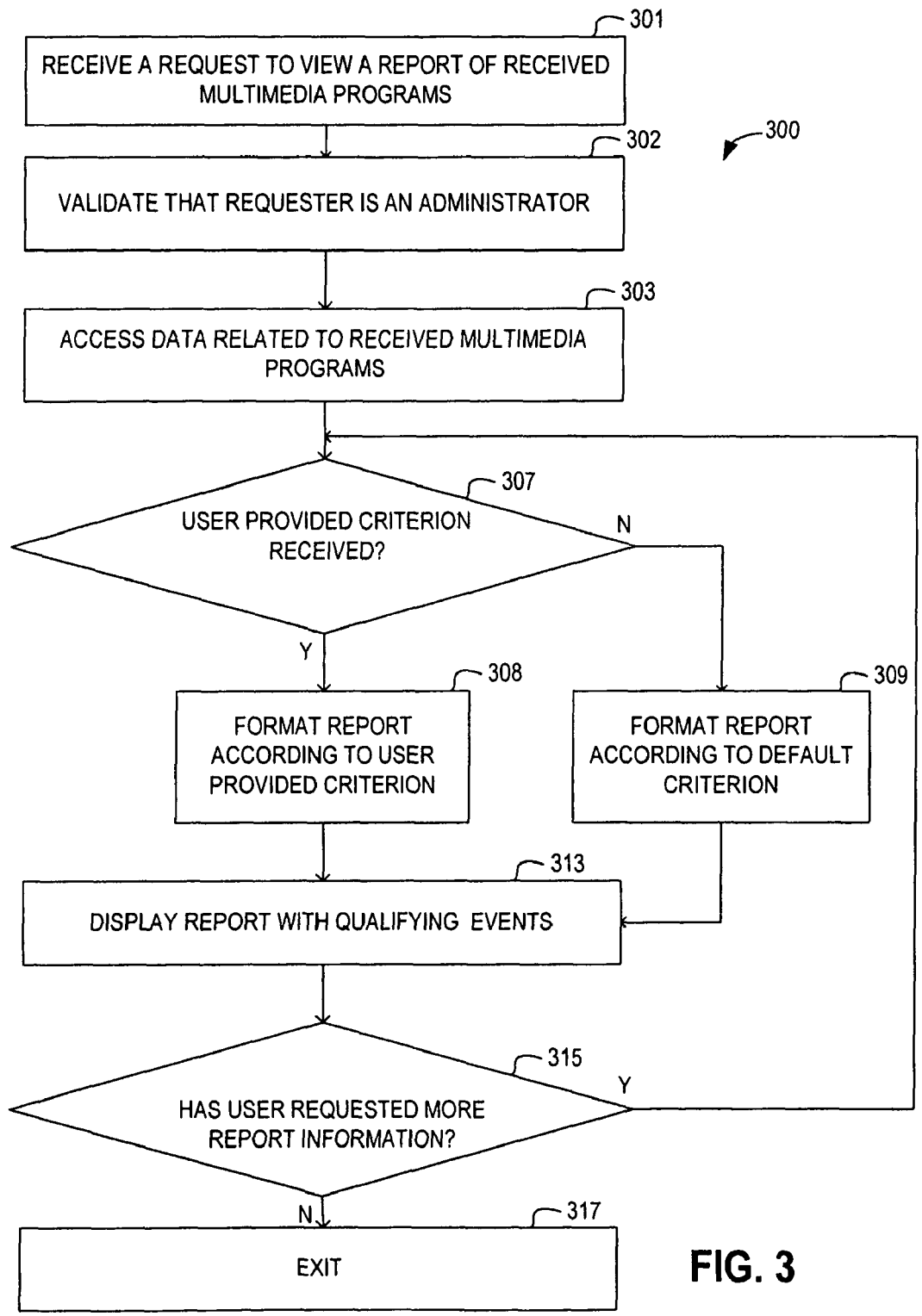
FIG. 3 illustrates selected operations in a method for analyzing multimedia program selections according to user provided parameters and providing a report of qualifying multimedia program selections.

As shown, FIG. 3 illustrates a method 300 for providing a report of multimedia selections that qualify for the report according to user provided parameters. As shown, method 300 includes receiving (block 301) a request to view a report of received multimedia programs and an optional operation for validating (block 302) that the requester is an administrator (e.g., parent). Data related to received multimedia programs is accessed (block 303). Data that has exceeded a retention period is purged and not available for access.

A determination is made (block 307) whether a user provided criterion (i.e., a report requirement) is available for formatting a report. If so, a report is formatted (block 308) using the user provided criterion. For example, a user may specify that the report contains indications of the top ten most viewed channels as ranked by the viewing durations of the channels over the last week. If user provided criterion is not received (block 307), the report is formatted according to default criterion. Once all potentially eligible events are processed, the report is displayed (block 313) with qualifying multimedia presentation events (e.g., channel selections or multimedia program selections) that meet the user specified requirements. Accordingly, disclosed systems, methods, and machines provide users with a manageable amount of data related to received multimedia program selections. A determination is made (block 315) whether a user has requested additional report information. If so, method 300 returns to provide (blocks 307-313) a report according to user provided criterion. If not, method 300 ends (block 317).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A system for providing a report of multimedia presentation events, the system comprising:
receiving user input defining criteria for including a multimedia presentation event in the report, wherein the criteria includes:
a maximum retention period;
a threshold presentation duration; and
a report condition;
responsive to a user receiving a multimedia program for a time at least as great as the threshold presentation duration, storing receipt data indicating receipt of the multimedia program;
determining, from the receipt data, whether the receipt of the multimedia program meets the report condition; and
responsive to a user input, providing the user with access to the event report, wherein the event report indicates the receipt of the multimedia program if the receipt data meets the report condition; and
purging the receipt data when an age of the receipt data is at least as great as a maximum retention period.

2. The system of claim 1, wherein the event report includes an indication of a channel associated with the multimedia program.

3. The system of claim 1, the system further comprising:
restricting access to the event report to an administrator.

4. The system of claim 1, wherein storing the receipt data includes summing noncontiguous presentation periods for a plurality of selections of the multimedia program to determine whether the criterion for the threshold presentation duration is met.

5. The system of claim 1, further comprising:
an action selected from storing the event report and displaying the event report.

6. The system of claim 1, further comprising:
receiving the receipt data from a user customer premises equipment.

7. The system of claim 1, further comprising:
presenting the user with a plurality of selectable predetermined threshold presentation durations.

8. The system of claim 1, further comprising:
presenting the user with a plurality of selectable predetermined retention periods.

9. The system of claim 8, wherein the plurality of predetermined selectable retention periods includes at least one of one month and one week.

10. A process for reporting qualifying selections of multimedia programs, the process comprising:
receiving user input defining when a multimedia program selection qualifies as a qualifying selection based on user input indicating a maximum retention period, a minimum presentation duration, and a report criterion;
monitoring user selections of multimedia content, wherein monitoring includes comparing a receiving duration, during which a selected multimedia program indicated by the multimedia program selection is received by a user, to the minimum presentation duration;
storing selection data indicative of the selected multimedia program when the receiving duration is not less than the minimum presentation duration;
responsive to determining that the multimedia program selection qualifies as a qualifying selection, classifying the selection data as qualifying selection data;
marking a portion of the selection data having an age exceeding the maximum retention period for deletion; and
providing an event report including the qualifying selection data having an age not exceeding the maximum retention period.

11. The process of claim 10, wherein the event report further includes an indication of a channel associated with the selected multimedia program.

12. The process of claim 10, further comprising:
storing an indication of the multimedia program selection.

13. The process of claim 10, wherein the retention period is one month.

14. The process of claim 10, wherein the retention period is one week.

15. A non-transitory computer readable storage medium including instructions for:
   receiving user input defining criteria for including a multimedia presentation event in an event report, wherein the criteria include:
      a maximum retention period;
      a threshold presentation duration; and
      a report condition;
   responsive to a user receiving a multimedia program for a time at least as great as the threshold presentation duration, storing receipt data indicating receipt of the multimedia program;
   determining, from the receipt data, whether the receipt of the multimedia program meets the report condition;
   responsive to a user input, providing the user with access to the event report, wherein the event report indicates the receipt of the multimedia program if the receipt data meets the report condition; and
   purging the receipt data when an age of the receipt data is at least as great as a maximum retention period.

16. The non-transitory computer readable medium of claim 15, wherein the retention period is selected from one week and one month.

17. The non-transitory computer readable medium of claim 15, wherein the event report further includes an indication of a channel associated with the multimedia program.

* * * * *